US006871327B2

(12) United States Patent
Polk

(10) Patent No.: US 6,871,327 B2
(45) Date of Patent: Mar. 22, 2005

(54) METHOD AND APPARATUS FOR EXTENDING COVERAGE OF GUI TESTS

(75) Inventor: George Allyn Polk, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 562 days.

(21) Appl. No.: 10/090,188

(22) Filed: Mar. 4, 2002

(65) Prior Publication Data
US 2003/0164854 A1 Sep. 4, 2003

(51) Int. Cl.[7] .............................. G06F 13/00
(52) U.S. Cl. .................... 715/856; 715/862
(58) Field of Search ................ 715/856, 866, 715/862

(56) References Cited

U.S. PATENT DOCUMENTS 5,732,228 A * 3/1998 Jaaskelainen, Jr. .......... 345/862
6,237,004 B1 * 5/2001 Dodson et al. ............. 707/102

* cited by examiner

Primary Examiner—Cao (Kevin) Nguyen
(74) Attorney, Agent, or Firm—Osha & May L.L.P.

(57) ABSTRACT

A method of testing a graphical user interface includes selecting a widget of the graphical user interface, associating an access mode with the widget, generating a mode-specific input message based on the widget and the access mode, sending the mode-specific input message to the graphical user interface, detecting a mode-specific response from the graphical user interface using a detection tool, and evaluating the graphical user interface based on the mode-specific response.

19 Claims, 7 Drawing Sheets

METHOD AND APPARATUS FOR EXTENDING COVERAGE OF GUI TESTS

BACKGROUND OF THE INVENTION

A Graphical User Interface (GUI) is part of a software application that interacts with a user via a graphical display. The GUI receives input from the user through different modes of access, such as a mouse and pointer combination, or through a keyboard. A visual output of a GUI is typically displayed on a display device, such as a computer monitor screen, and includes widgets that allow the user to interact with the GUI. Examples of widgets include windows, captions, buttons, labels, menu bars, toolbars, dialog boxes, menus, icons, etc. An example of a GUI visual output is a window (12) having a menu bar (16) as shown in FIG. 1. In this example, there are two menus in the menu bar (16), an Edit menu (18) and a File menu (20), as indicated by appropriate labels. Widgets may also represent software applications that may be executed by the user, such as a Web Browser widget (22), which represents a Web Browser application, or a pointer icon (24), which represents the position of a mouse.

When the user interacts with the GUI by, for example, clicking the mouse while the pointer is positioned above a widget, a message is sent from the mouse to the GUI. The message is a signal transmitted by a computer on which the GUI is executing, and is directed to and accesses the widget. The message may be relayed from the mouse to the GUI by means of a system tool such as an operating system (or other intermediary software application, such as a windowing toolkit) that manages the computer system or graphical display on which the GUI operates. The GUI interprets the message and determines whether to take action based on the position of the pointer when the mouse was clicked. Referring to FIG. 1, if the user clicks on the File menu (20), a message is sent from the mouse to the GUI, accessing the File menu (20) item. The GUI receives the message, interprets the message and determines that the user wants the File menu (20) to be expanded. The GUI then alters the screen image to reflect the expansion of the File menu (20). The altered screen image with the expanded File menu (20) is shown in FIG. 2. In this example, the expanded File menu (20) includes an Open menu item (26) and a Close menu item (28).

In addition to a mouse and pointer combination, other widget access modes include the mnemonic key combinations in order to access widgets. Referring back to FIG. 1, in order to open the File menu (20), instead of using the mouse and pointer, the user may press and hold down the "Alt" key and press the "F" key, which is underlined in the label of the File menu (20). Likewise, other widgets with underlined letters may be accessed similarly. Also, the user may utilize programmable shortcut keys in order to access menu items. For example, as a shortcut to access the Open menu item (26), the user may press the F2 key that is programmed with the shortcut to open the File menu (20). Shortcut keys may involve key sequences, e.g., a "Control" key plus an "L" key may be used to access a widget.

Another access mode is keyboard navigation. A widget that is highlighted (i.e., the widget that receives action from the mouse or keyboard, usually indicated by a dashed border) is said to have the "focus." The focus changes from one widget to another widget every time a key, e.g., the tab key, an arrow key, etc., is pressed, allowing the user to traverse the widgets by successively pressing the key. When the desired widget has focus, pressing the "Enter" key accesses the widget. Widgets may also be accessed by the accessibility function, which allows one or more software applications that help physically impaired users interact with a GUI or with a computer. For example, in order to allow physically impaired individuals to operate a GUI, customized mechanical devices may be used to detect movements of a user's head by translating movement of the user's head into messages to the operating system and/or windowing toolkit, which relays the messages to the GUI. Thus, a substitute is provided for a mouse. The accessibility function may be implemented and used in a variety of ways, and may assist users to overcome a variety of physical impairments.

As shown in FIG. 3, a GUI testing tool (GTT) (40) is a software application that may be used to perform a test of a GUI (41) in order to detect errors in the construction and operation, etc., of the GUI (41). In order to test the GUI (41), the GTT (40) typically operates in conjunction with a test suite (42). The test suite (42) is a collection of one or more tests or scripts used to determine whether the GUI (41) is functioning as specified. A test typically contains one or more simulated user actions, which are input into the GTT (40), which translates the simulated user actions into messages to be sent to the GUI (41) that is being tested. The simulated user actions are designed to exercise one or more features of the GUI (41) by simulating user actions. For example, the simulated user action "SelectMenu (FileMenu)" simulates a user using the mouse to select the File Menu. The test suite (42) may be created by a person involved in software testing, e.g., a test developer, software engineer, etc.

The test suite (42) is accessed by the GTT (40). The GTT (40) reads a simulated user action (47) (such as the "SelectMenu(FileMenu)") from the test suite (42) and, based upon the simulated user action (47), generates an input message (48), which is sent to the GUI (41). The input message is directed to the GUI (41) and/or directed to a specific widget or widgets included in the GUI (41). Thus, the GTT (40) simulates user actions directed to the GUI (41). The GUI (41) responds to the input message (48), and the GTT (40) acquires and evaluates the response (49) of the GUI (41) and determines whether the response (49) is proper. In order to determine whether the response (49) is proper, the GTT (40) refers to a reference file (50) that includes a proper response for particular simulated user actions. Alternatively, the reference file (50) may be part of the test suite (42). The GTT (40) compares the reference file (50) contents with the response (49) of the GUI (41) by using a detection tool, such as a widget hierarchy detection tool that obtains a widget hierarchy of the GUI (41) after the GUI (41) has changed in response to the input message (48). The GTT (40) may use other detection tools, such as a bitmap detection tool, in order to determine whether the response (49) is proper. Thus, the GTT (40) may acquire a post-response bitmap drawn by the GUI (41) to use for comparison purposes. Typically, proper responses are gathered prior to testing, stored in the reference file (50), and used later for formal test execution of the GUI (41). Often, the GUI (41) is tested after changes have been made to the software application being tested.

A GUI includes source code statements that handle different tasks. For example, a particular group of source code statements included in the GUI may be responsible for drawing images on a computer screen. Another group of source code statements may be responsible for handling user input from the mouse, and yet another group of source code statements may be responsible for handling user input from shortcut keys. Therefore, different modes of accessing a widget cause different groups of source code statements in the GUI to be executed. Furthermore, different modes of accessing a particular widget cause different messages to be sent to the GUI with which the widget is associated. Typically, a goal of the test developer is to test as many aspects and functions of the GUI as possible, and to cause the execution of as many groups of source code statements included in the GUI as possible. Therefore, a goal of a test developer is to test the widgets in the GUI for different access modes. Generally, the more access modes that are covered during a test of a GUI, the more errors that can be detected. As a result, the final product (i.e., the GUI), as delivered to a customer, is more robust because coverage of access modes during testing is enhanced.

SUMMARY OF THE INVENTION

In general, in one aspect, the invention relates to a method of testing a graphical user interface. The method comprises selecting a widget of the graphical user interface, associating an access mode with the widget, generating a mode-specific input message based on the widget and the access mode, sending the mode-specific input message to the graphical user interface, detecting a mode-specific response from the graphical user interface using a detection tool, and evaluating the graphical user interface based on the mode-specific response.

In general, in one aspect, the invention relates to a method of testing a graphical user interface. The method comprises selecting a widget of the graphical user interface, associating an access mode with the widget, generating a mode-specific input message based on the widget and the access mode, sending the mode-specific input message to the graphical user interface, detecting a mode-specific response from the graphical user interface using a detection tool, evaluating the graphical user interface based on the mode-specific response, generating an output based on evaluating the graphical user interface; and associating an alternate user action with the widget.

In general, in one aspect, the invention relates to a computer system for testing a graphical user interface. The computer system comprises a processor, a memory, storage device, a display device, and software instructions stored in the memory for enabling the computer system under the control of the processor. The software instructions perform selecting a widget of the graphical user interface, associating an access mode with the widget, generating a mode-specific input message based on the widget and the access mode, sending the mode-specific input message to the graphical user interface, detecting a mode-specific response from the graphical user interface using a detection tool, and evaluating the graphical user interface based on the mode-specific response.

In general, in one aspect, the invention relates to a computer system for testing a graphical user interface. The computer system comprises a processor, a memory, storage device, a display device, and software instructions stored in the memory for enabling the computer system under the control of the processor. The software instructions perform selecting a widget of the graphical user interface, associating an access mode with the widget, generating a mode-specific input message based on the widget and the access mode, sending the mode-specific input message to the graphical user interface, detecting a mode-specific response from the graphical user interface using a detection tool, evaluating the graphical user interface based on the mode-specific response, generating an output to the display device based on evaluating the graphical user interface, and associating an alternate user action with the widget.

In general, in one aspect, the invention relates to a storage medium for storing a mode-specific library message. The storage medium comprises a plurality of rows associated with a widget and a plurality of columns associated with an access mode.

In general, in one aspect, the invention relates to an apparatus for testing a graphical user interface. The apparatus comprises means for selecting a widget of the graphical user interface, means for associating an access mode with the widget, means for generating a mode-specific input message based on the widget and the access mode, means for sending the mode-specific input message to the graphical user interface, means for detecting a mode-specific response from the graphical user interface using a detection tool, means for evaluating the graphical user interface based on the mode-specific response, means for generating an output based on evaluating the graphical user interface, and means for associating an alternate user action with the widget.

Other aspects and advantages of the invention will be apparent from the following description and the appended claims.

DETAILED DESCRIPTION

Figure 1:
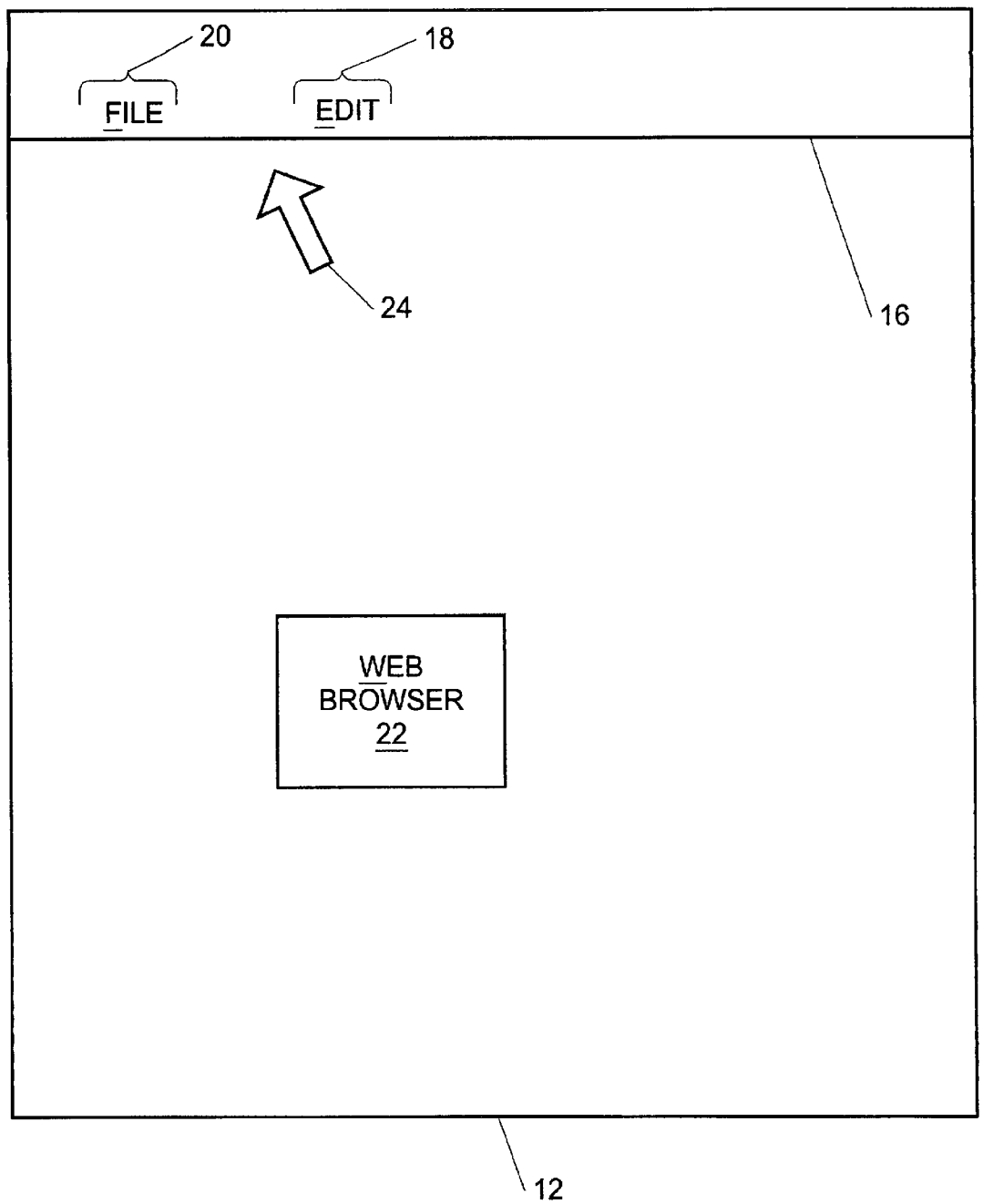
FIG. 1 shows an example of a GUI.
Figure 2:
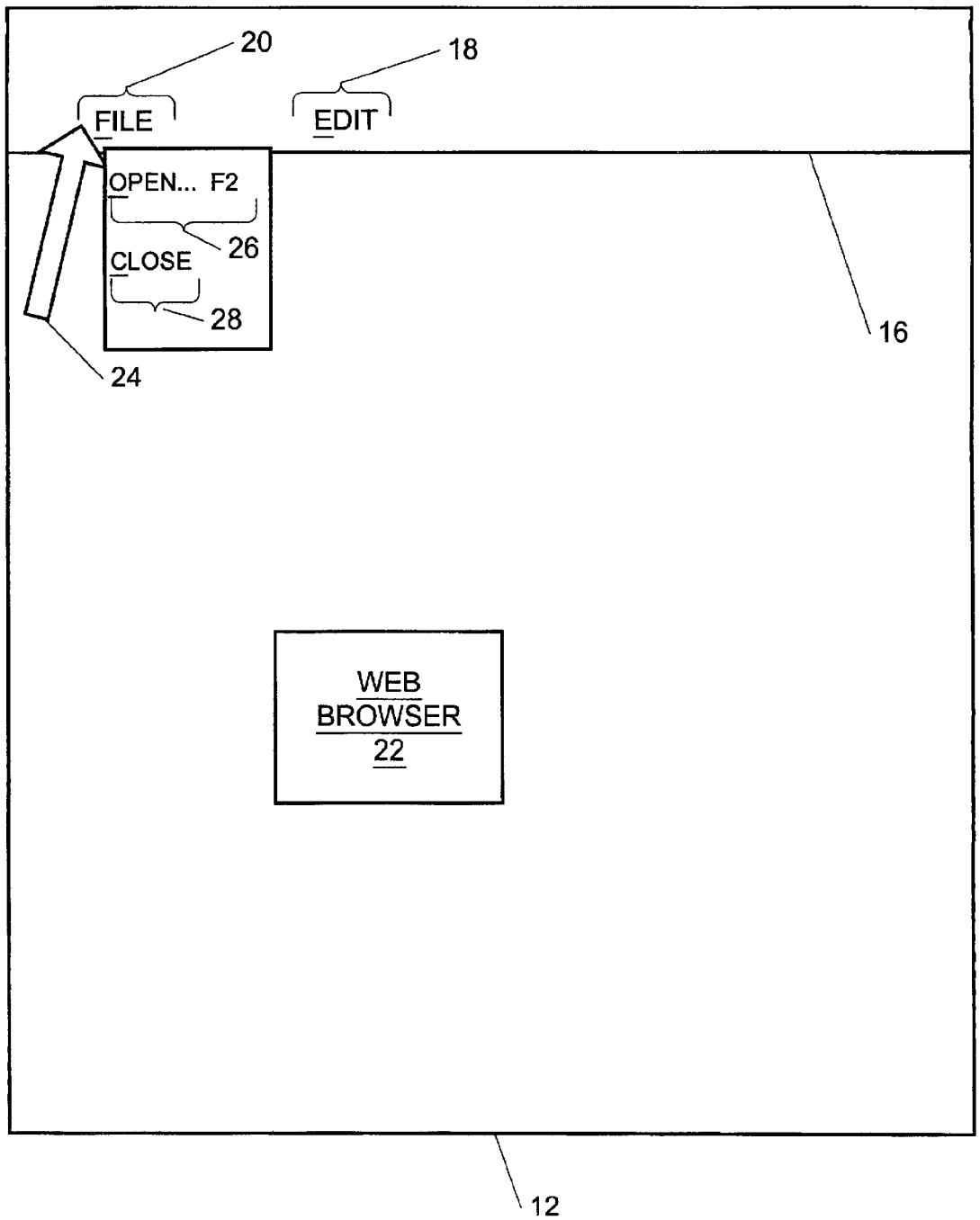
FIG. 2 shows an example of a GUI with an expanded menu.
Figure 3:
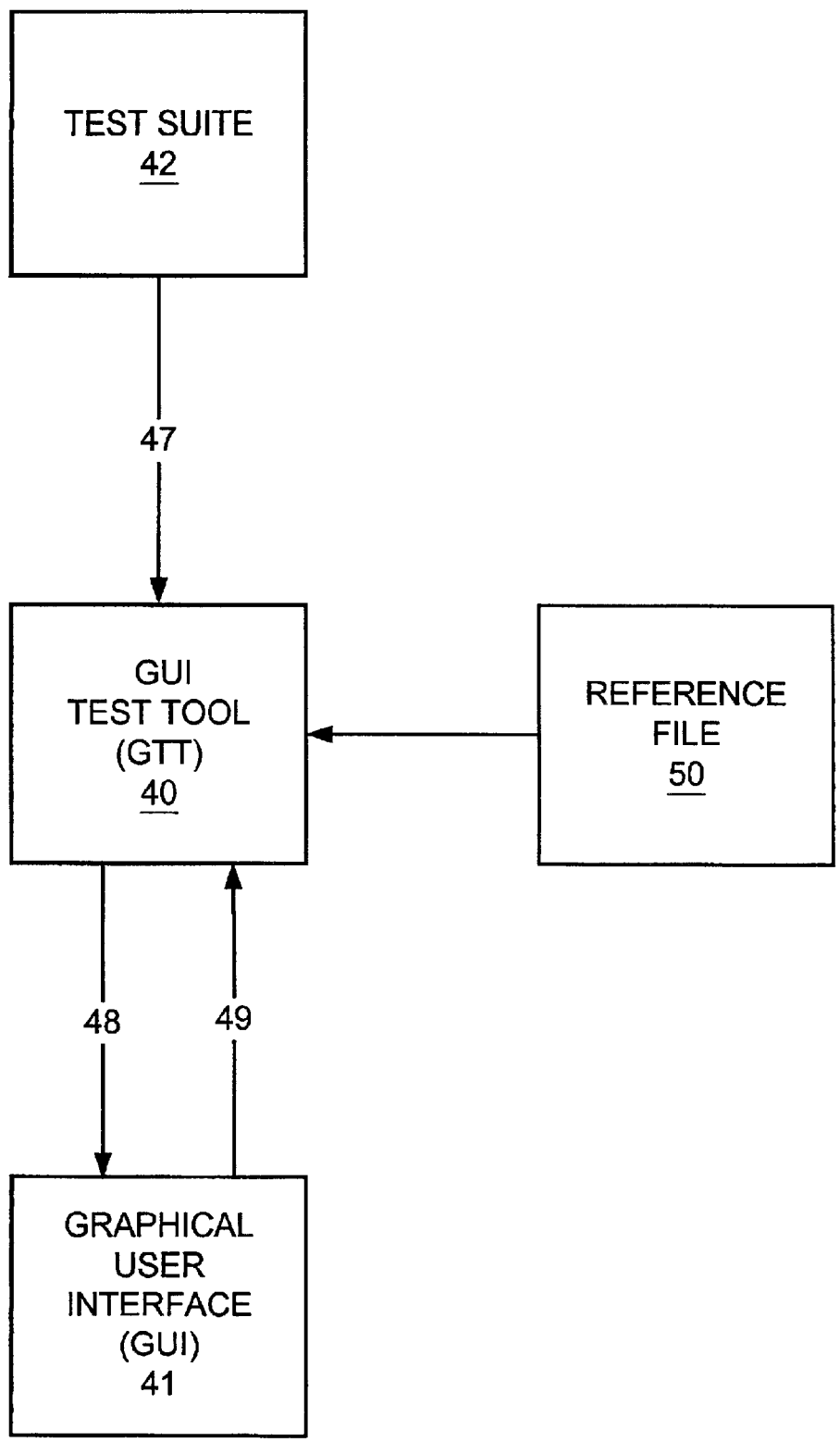
FIG. 3 shows entities involved in a GUI test.

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 4:
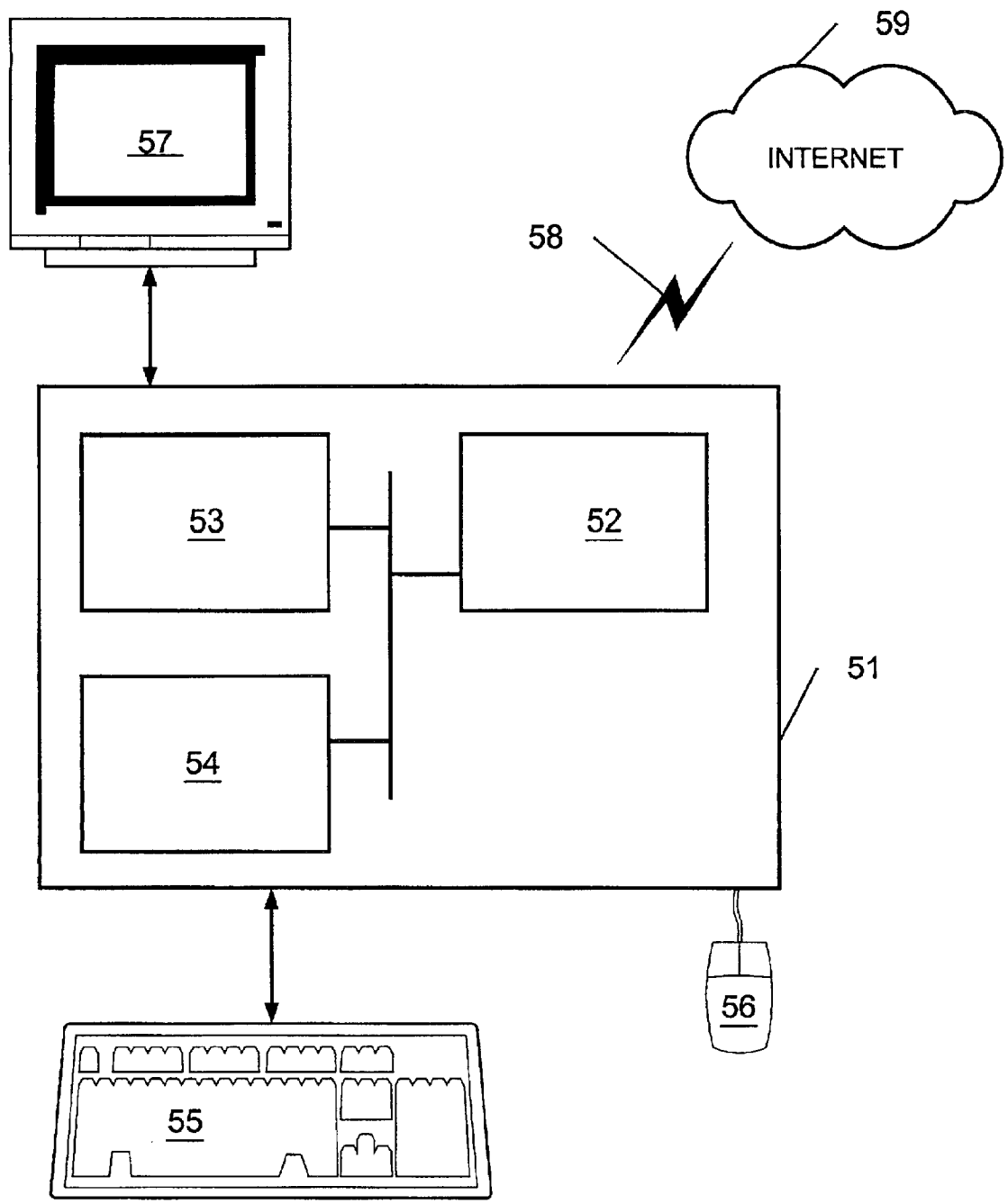
FIG. 4 shows a computer system connected to a Wide Area Network (WAN).

The present invention may be implemented on virtually any type computer regardless of the platform being used. For example, as shown in FIG. 4, a typical computer (51) includes a processor (52), an associated memory element (53), a storage device (54), and numerous other elements and functionalities typical of today's computers (not shown). The computer (51) may also include input means, such as a keyboard (55) and a mouse (56), and an output device, such as a monitor (57). Those skilled in the art will appreciate that these input and output means may take other forms in an accessible environment. The computer (51) is connected via a network connection (58) to a Wide Area Network (WAN) (59), such as the Internet.

A test developer who creates a test suite to test a GUI may desire to test the ability of the GUI to allow a user to access widgets in different access modes, e.g., using mouse and pointer, accessibility function, etc., and thereby extend test coverage of the GUI. In order to minimize the amount of work done by the test developer, and yet still expand test coverage of the GUI, a Mode-Based Message Selection Tool (MBMST) may be used, in conjunction with other entities.

Figure 5:
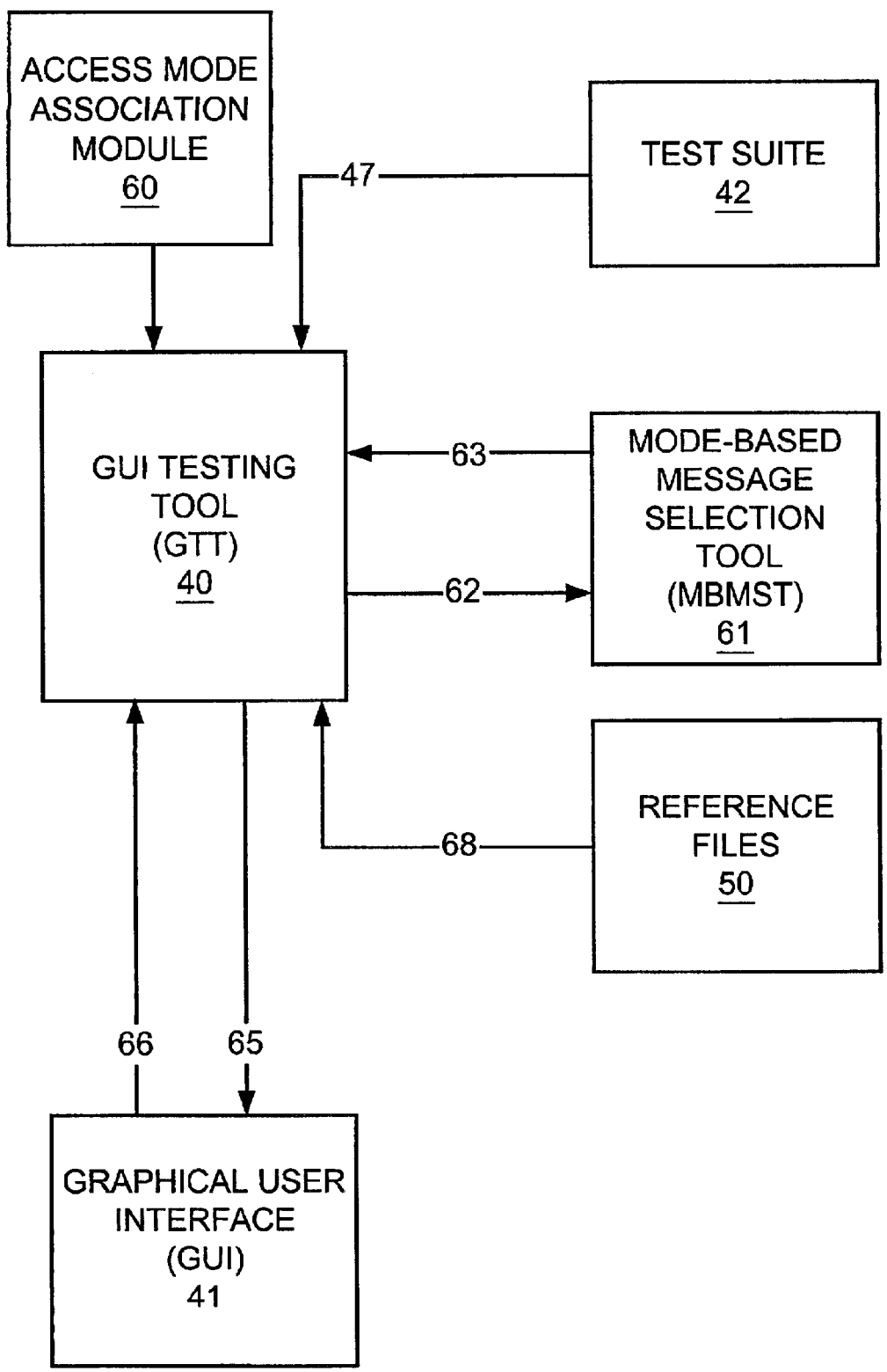
FIG. 5, in accordance with one or more embodiments of the present invention, shows entities involved in a GUI test using a Mode-Based Message Selection Tool (MBMST).

In accordance with one or more embodiments of the present invention, an MBMST and associated entities are shown in FIG. 5. A test suite (42) includes tests that contain input to the GTT (40) that simulate user actions on a GUI (41). A simulated user action (47) may be associated with one or more widgets, e.g., a simulated user action (47) to simulate accessing a file menu. In order to perform a GUI test on a GUI (41), a GTT (40) reads a simulated user action (47) from the test suite (42). An access mode association module (60) associates the simulated user action (47) with an access mode, e.g., mouse and pointer, mnemonic function keys, etc. The GTT (40) sends an associated input (62) to the MBMST (61). Based on the access mode and the widget associated with the associated simulated user action (62), the MBMST (61) selects a mode-specific library message (63) and sends the mode-specific library message (63) to the GTT (40). The GTT (40) sends a mode-specific input message (65) to the GUI (41). The mode-specific input message (65) may be based on (or a modified version of) the mode-specific library message (63). The GUI (41) responds to the mode-specific input message (65), and the GTT (40) acquires a mode-specific response (66) from the GUI (41). The GTT (40) compares the mode-specific response (66) to a proper mode-specific response (68) stored in a reference file (50). The GTT (40) stores a result of the GUI test in an appropriate location, e.g., a computer file stored on a hard drive, floppy drive, etc, and/or displays the result in an appropriate output display device, such as a computer monitor, printer, etc. One skilled in the art will appreciate that, in accordance with one or more embodiments of the present invention, the arrangement of entities as shown in FIG. 5 may vary. For example, the access mode association module (60) may be located in a different position than shown in FIG. 5. Furthermore, the MBMST (61) may be integrated in the GTT (40), in which case, the mode-specific library message (63) may be sent directly to the GUI (41) from the MBMST (61).

Figure 6:
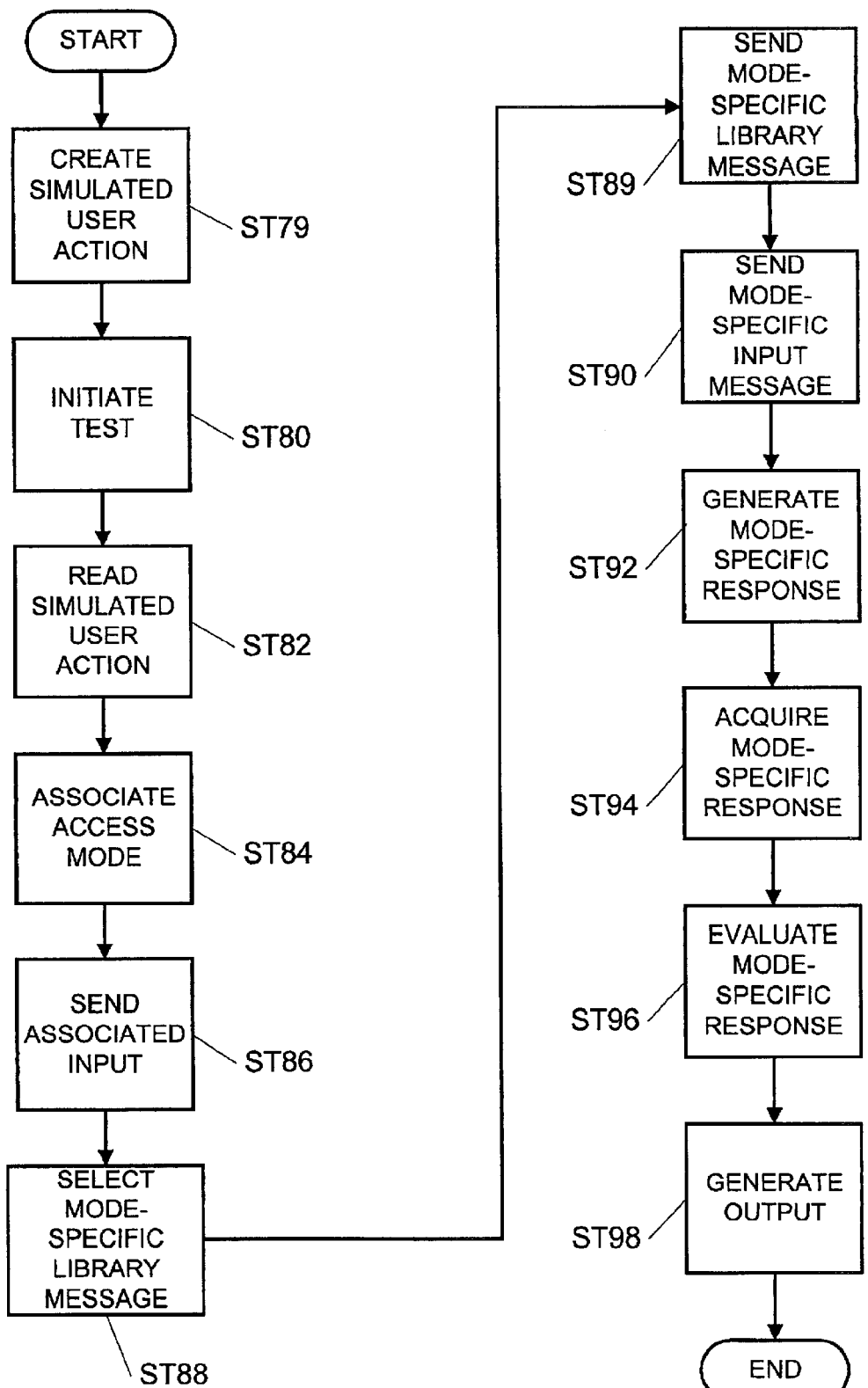
FIG. 6, in accordance with one or more embodiments of the present invention, shows a method of testing a GUI using an MBMST.

In accordance with one or more embodiments of the present invention, a sequence of operations involved in testing a GUI using an MBMST is shown in FIG. 6. To begin, a simulated user action is created as part of a test (Step 79) and is associated with a widget. One way that a simulated user action is created and associated with a widget is by having a test developer write a simulated user action such as "SelectMenu (FileMenu)" as part of the test suite. For example, the simulated user action may be associated with the File menu widget, but may not be associated with an access mode. Also, a GTT (40) may employ a "record and replay" mode, where a test developer interacts with a GUI, e.g., by mouse and keyboard, thereby providing user actions that may be captured and edited and used later for testing purposes.

Continuing the sequence, the test of the GUI is executed (Step 80). The test may be executed either manually or automatically. Often, a test engineer, a test developer, etc., initiates a test by starting a GTT. Often, a test suite is created for use later during the development cycle of a GUI or other software application.

Continuing the sequence, a simulated user action from the test suite is read into the GTT (Step 82). Next, an access mode is associated with the simulated user action using an access mode association module (Step 84). An access mode may be associated with the simulated user action through various methods, such as a manual method of associating the simulated user action with an access mode. For example, the test engineer, when initiating the test, may pass a command line parameter to be used as the access mode for the test. Also, many commercial varieties of GTT's allow tests to be programmed so that a simulated user action may be programmatically associated with an access mode. The access mode association module may be programmed so that different simulated user actions included in a test suite may be associated with different access modes, e.g., access modes may be associated randomly.

Continuing the sequence, the associated simulated user action is sent to the MBMST from the GTT (Step 86). The associated simulated user action includes information regarding a widget and an access mode included in the associated input. For example, a particular associated simulated user action may include information regarding the Web Browser widget and the mouse and pointer access mode.

Continuing the sequence, a mode-specific library message is selected by the MBMST using the information included in the associated simulated user action regarding the access mode and widget (Step 88). For each combination of access mode and widget, there exists a library message, which is selected by the MBMST. However, certain access modes, e.g., (mnemonics, keyboard shortcuts) are not available for all widgets. In these cases that do not have mode-specific library messages, the default access mode(s) (e.g., mouse and keyboard) may be used.

Continuing the sequence, the mode-specific library message is sent by the MBMST to the GTT (Step 89). The mode-specific library message may be modified to adapt to a variety of implementation in a variety of system environments. Next, a mode-specific input message (based on the mode-specific library message is sent to the GUI from the GTT (Step 90), and a mode-specific response to the mode-specific input message is generated by the GUI (Step 92). A mode-specific response will not differ for different access modes that are applied to a particular simulated user action, if the GUI being tested is functioning properly. Thus, the same test (from a test suite) is useful for purposes of testing a GUI, regardless of an access mode being used. However, an access mode for an accessibility function may require additional GUI test functionality in order to verify proper GUI functioning.

Continuing the sequence, the mode-specific response is acquired by the GTT using an operating system and/or other appropriate software application(s) (Step 94). For example, the GTT may use a windowing toolkit and the operating system to obtain a widget hierarchy representation of the GUI. The widget hierarchy includes a representation of the status of widgets included in the GUI, thereby providing the GTT knowledge of how the GUI responded to the mode-specific library message. Additionally, the test (from the test suite), in accordance with one or more embodiments of the present invention, may have access to operating system and/or windowing toolkit functions in order to obtain information regarding a widget hierarchy or other aspects of a GUI.

Next, the mode-specific response is evaluated by the GTT by comparing the mode-specific response to a proper mode-specific response stored in a reference file (Step 96).

Next, an output representing a result of the test, i.e., whether the mode-specific response is the same as the proper mode-specific response, is generated by the GTT (Step 98). For example, the result of the test may be saved in a computer file or displayed to a display device e.g., a computer monitor.

One skilled in the art will appreciate that the sequence of operations shown in FIG. 6 and described above may differ in accordance with one or more implementations of the present invention.

Figure 7:
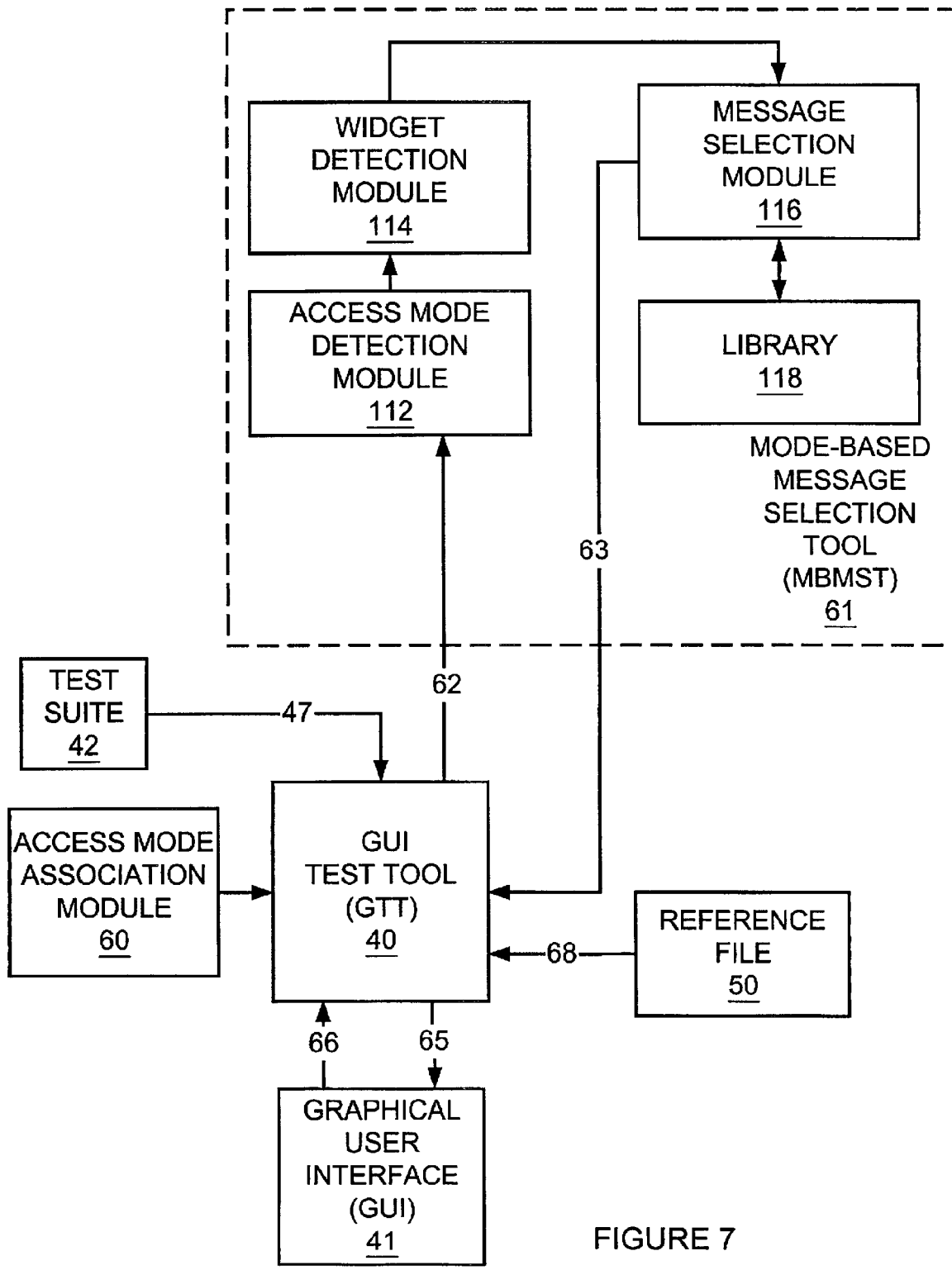
FIG. 7, in accordance with one or more embodiments of the present invention, shows entities included in an MBMST.

In accordance with one or more embodiments of the present invention, as shown in FIG. 7, the MBMST (61) includes an access mode detection module (112), a widget detection module (114), a message selection module (116), and a library (118). The access mode detection module (112) detects the access mode associated with the associated simulated user action (62). The widget detection module (114) detects the widget associated with the associated simulated user action (62). For example, if a simulated user action (47) included in the test suite (42) is "SelectWidget (OpenMenuItem)," then the widget associated with the associated simulated user action (62) is the Open menu item. The message selection module (116) selects a mode-specific library message (63) from a library (118), using the access mode and widget associated with the associated simulated user action (62). The message selection module (116) sends the mode-specific library message (63) to the GTT (40).

A combination of a widget and an access mode associated with the associated simulated user action (62) are used by a message selection module (116) in order to select a mode-specific library message (63) from the library (118). In accordance with one or more embodiments of the present invention, the library (118) is structured in a tabular form, where mode-specific library messages are stored, and indexed by row and column. For example, each row of the library (118) may be associated with a widget, e.g., a first row may be associated with a particular button, a second row may be associated with a File menu, etc. Each column of the library (118) may be associated with a particular access mode (e.g., a first column may be associated with mnemonic keys). Thus, a combination of a particular access mode and a particular widget enables a table lookup for an appropriate mode-specific library message, given a particular combination of widget and access mode.

The particular structure of the library and manner of accessing an appropriate mode-specific library message may vary with different embodiments of the present invention. For example, a mode-specific library message may be selected using a function call or Application Programming Interface (API) call, as shown by example below:

Mode-specific library message=Library (<widget>, <access mode>).

In one or more alternate embodiments of the present invention, the library (118) may be organized using object-oriented principles, i.e., using one or more class hierarchies, thus allowing a mode-specific library message to be accessed using a method of an object, as shown by example below:

Mode-specific library message=MBMST.Library.getMessage (<widget>, <access Mode>).

Additional access modes may be added to a GUI test by modifying appropriate entities, such as the access mode association module (60), the MBMST (61), or the library (118).

A user may perform more than one action upon certain widgets. For example, a user may type text into a text field of a GUI or select (highlight) text in the text field. In one or more embodiments of the present invention, alternate user actions may be accounted for with respect to a GUI test. For example, for widgets that permit the user to perform alternate user actions, a user "<action>" parameter may be added to an MBMST.Library method, as shown below using a class-based implementation, where "<action>" may represent an alternate user action such as typing text or highlighting text.

Mode-specific library message=MBMST.Library.getMsg (<widget>, <action>, <access Mode>)

As new alternate user actions are made available for widgets, or as new widgets are added to a GUI, necessary modifications may be made as needed, e.g., modifying the library (118), thus allowing use of the same test (from the test suite (42)).

Advantages of the present invention include one or more of the following. Because messages directed to the same widget, but associated with different access modes, are handled by different groups of source code statements in a GUI, the coverage of the GUI by a test is extended in comparison to a test where only a single access mode is involved. Thus, a test developer may create a test suite to test a GUI without regard to access mode, and receive the benefit of testing the GUI with more than one access mode. Because association of access modes and user actions with widgets is independent of test suite creation, new access modes and user actions may be added to a GUI without necessitating modification of tests in a test suite.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of testing a graphical user interface, comprising:

selecting a widget of the graphical user interface;

associating an access mode with the widget;

generating a mode-specific input message based on the widget and the access mode;

sending the mode-specific input message to the graphical user interface;

detecting a mode-specific response from the graphical user interface using a detection tool; and evaluating the graphical user interface based on the mode-specific response.

2. The method of claim 1, wherein selecting the widget of the graphical user interface occurs independently of associating the access mode with the widget.

3. The method of claim 1, wherein selecting the widget comprises:

creating a simulated user action associated with the widget; and reading the simulated user action from a test suite.

4. The method of claim 1, wherein associating the access mode is random.

5. The method of claim 1, wherein the detection tool comprises a widget hierarchy detection tool.

6. The method of claim 1, wherein the detection tool comprises a bitmap detection tool.

7. The method of claim 1, wherein generating the mode-specific input message comprises:
   detecting the access mode;
   detecting the widget;
   selecting a mode-specific library message using the access mode and the widget;
   modifying the mode-specific library message into a mode-specific input message; and
   sending the mode-specific input message to the graphical user interface.
8. The method of claim 7, further comprising:
   storing the mode-specific library message in a tabular data structure.
9. The method of claim 7, further comprising
   storing the mode-specific library message using a class hierarchy.
10. The method of claim 1, wherein evaluating the graphical user interface comprises
    comparing the mode-specific response to a proper mode-specific response.
11. The method of claim 10, wherein the proper mode-specific response is stored in a reference file.
12. The method of claim 1, further comprising:
    generating an output based on evaluating the graphical user interface.
13. The method of claim 12, further comprising:
    displaying the output on a display device.
14. The method of claim 12, further comprising:
    storing the output on a computer readable medium.
15. The method of claim 1, further comprising:
    associating an alternate user action with the widget.
16. A method of testing a graphical user interface, comprising:
    selecting a widget of the graphical user interface;
    associating an access mode with the widget;
    generating a mode-specific input message based on the widget and the access mode;
    sending the mode-specific input message to the graphical user interface;
    detecting a mode-specific response from the graphical user interface using a detection tool;
    evaluating the graphical user interface based on the mode-specific response;
    generating an output based on evaluating the graphical user interface; and
    associating an alternate user action with the widget.
17. A computer system for testing a graphical user interface, comprising:
    a processor;
    a memory;
    a storage device;
    a display device; and
    software instructions stored in the memory for enabling the computer system under the control of the processor, to perform:
       selecting a widget of the graphical user interface;
       associating an access mode with the widget;
       generating a mode-specific input message based on the widget and the access mode;
       sending the mode-specific input message to the graphical user interface;
       detecting a mode-specific response from the graphical user interface using a detection tool; and
       evaluating the graphical user interface based on the mode-specific response.
18. A computer system for testing a graphical user interface, comprising:
    a processor;
    a memory;
    a storage device;
    a display device; and
    software instructions stored in the memory for enabling the computer system under the control of the processor, to perform:
       selecting a widget of the graphical user interface;
       associating an access mode with the widget;
       generating a mode-specific input message based on the widget and the access mode;
       sending the mode-specific input message to the graphical user interface;
       detecting a mode-specific response from the graphical user interface using a detection tool; and
       evaluating the graphical user interface based on the mode-specific response;
       generating an output to the display device based on evaluating the graphical user interface; and
       associating an alternate user action with the widget.
19. An apparatus for testing a graphical user interface, comprising:
    means for selecting a widget of the graphical user interface;
    means for associating an access mode with the widget;
    means for generating a mode-specific input message based on the widget and the access mode;
    means for sending the mode-specific input message to the graphical user interface;
    means for detecting a mode-specific response from the graphical user interface using a detection tool;
    means for evaluating the graphical user interface based on the mode-specific response;
    means for generating an output based on evaluating the graphical user interface; and
    means for associating an alternate user action with the widget.

* * * * *